United States Patent [19]
Martin et al.

[11] 3,839,982

[45] Oct. 8, 1974

[54] CARGO TANK VALVE SYSTEM

[75] Inventors: William Stephen Martin, Westerham; Michael John Chappell, Edenbridge, both of England

[73] Assignee: Wilson, Walton International Limited, Surrey, England; by said Michael J. Chappell

[22] Filed: Sept. 5, 1972

[21] Appl. No.: 286,302

[30] Foreign Application Priority Data
Sept. 6, 1971 Great Britain ................... 41542/71

[52] U.S. Cl. .......................... 114/74 R, 137/493.7
[51] Int. Cl. ...................... B63b 25/08, F16k 17/26
[58] Field of Search ... 114/74, 211; 137/493, 493.7, 137/493.9

[56] References Cited
UNITED STATES PATENTS
1,672,042   6/1928   Schmidt et al. ................. 137/493.7
3,031,856   5/1962   Wiedemann et al. ............. 114/74 A FOREIGN PATENTS OR APPLICATIONS
1,313,938   11/1961   France ............................ 137/493.7

Primary Examiner—Trygve M. Blix
Assistant Examiner—Sherman D. Basinger
Attorney, Agent, or Firm—Wenderoth, Lind & Ponack

[57] ABSTRACT

To prevent a ship having closed cargo tanks from being damaged, during loading and unloading under closed conditions, by reason of the occurrence of excessive vacuum conditions in such a tank, each tank has a vacuum relief valve which opens automatically when the pressure within the tank falls very slightly below the external ambient atmospheric pressure and which has an effective valve aperture sufficient to permit the ingress of air into the cargo tank at a velocity below 200 ft/sec. when the tank is being emptied at a maximum rate. Means is also provided for shutting off communication between the valve and the ambient atmosphere through the vacuum relief valve during a voyage. The vacuum relief valve may conveniently be provided in a common casing with breather valves and a constant-velocity blow-off valve.

6 Claims, 1 Drawing Figure

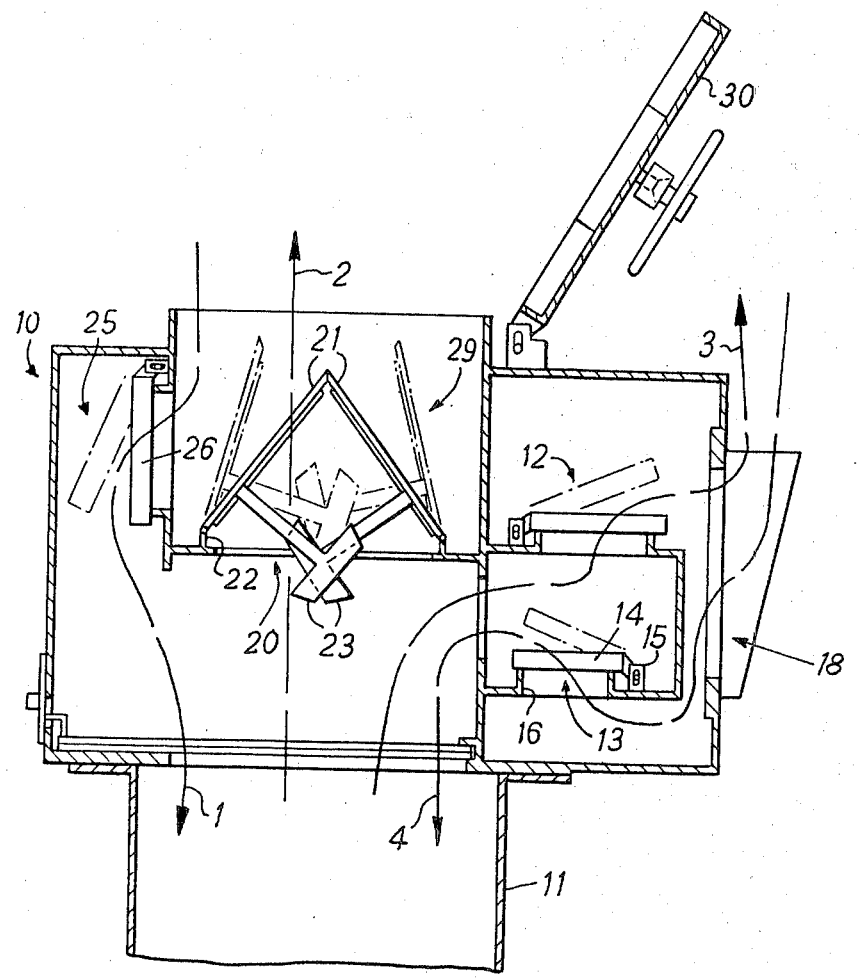

CARGO TANK VALVE SYSTEM

The present invention relates to tank ships and is particularly concerned with tank ships in which the tanks are loaded or unloaded under closed conditions.

It is already known to vent the gas from a tank, during loading, through a constant velocity valve which has the effect of maintaining a predetermined positive pressure in the tank during loading but which acts as a non-return valve when loading is completed. In the event of any rapid outflow of liquid from a full tank, sufficient vacuum can be produced in the upper part of the tank to cause the deck or hatch cover over the tank to collapse.

It is also known to unload a ships tank under closed conditions, replacing the displaced liquid by inert gas derived from the ship's boiler. Such inert gas systems are complicated and are arranged to shut down automatically in the event of a fault in any stage of the system. In the event of such an automatic shut-down of the system it is possible for sufficient vacuum to be produced in the tank by the unloading pumps to collapse the deck.

It is an object of the present invention to provide a means for overcoming these difficulties, which primarily occur through improper or negligent handling of the cargo loading and unloading valves and pumps by the ships crew.

In the first instance damage is normally the result of a failure to operate valves in the correct sequence when the loading of one tank has been completed and the loading of an adjacent empty tank is to be commenced. If the valves are incorrectly operated it is possible for liquid from the filled tank to flow very rapidly into the empty tank under the pressure head of the full tank. The maximum possible flow rate will be dependent upon the diameter of the pipe which interconnects the tanks, the maximum possible pressure head and the viscosity of the liquid. For the present purpose it is wisest to assume that the contents of the tank may have the viscosity of water.

In the case where the tank is unloaded inert gas is simultaneously supplied to the tank, the maximum rate of liquid removal is dependent upon the rating of the unloading pumps.

In both types of system the maximum rate of fluid outflow from the enclosed tank space is a simple matter of calculation in every case.

All tankship cargo tanks are provided with breather valves which allow gas to vent from the tank and allow air to enter the tank when the pressure inside the tank rises above or falls below ambient atmospheric pressure by a predetermined amount owing to changes of temperature.

In these circumstances, since only a small volume of gas or air is required to bring the pressure inside the tank substantially into balance with the ambient atmospheric pressure, the effective aperture size of such breather valves is quite small. In order to avoid over-frequent venting of gas from a full tank the breather valves are set to open at a pressure difference of about 1 lb/sq. inch, with the result that a conventional breather valve system will not allow the ingress of atmospheric air at a sufficient rate to prevent damage to the tank under the conditions mentioned above, which can occur only during loading and unloading.

It will be observed that it is only in the event of the above described failure in the loading procedure that vacuum conditions will arise in the tank and that it is highly desirable that vacuum conditions should be relieved automatically as rapidly as possible.

It is generally accepted that the velocity of any flow of air or gas into or out of a cargo tank must not exceed 6lm./sec. (200 ft/sec.) over any surface to avoid the risk of generation of electrostatic charges.

In accordance with the present invention a cargo tank of a tankship for loading under closed conditions is provided with a vacuum relief valve which opens automatically when the pressure within the tank falls very slightly below the external ambient atmospheric pressure and which has an effective valve aperture sufficient to permit the ingress of air into the cargo tank at a velocity below 200 ft/sec. when the tank is being emptied at maximum rate, means being provided for shutting off communication between the tank and the ambient atmosphere through said valve during a voyage.

One embodiment of the invention will now be described with reference to the accompanying diagrammatic Drawing showing a sectional view of an assembly incorporating a constant velocity blow-off valve, a pair of breather valves, and a vacuum relief valve.

The illustrated assembly is mounted in a casing 10 at the top of a standpipe 11 on the deck of a ship above a cargo tank. The standpipe may for example be 2.4 m. (8ft.) high and its lower end opens to the tank.

The breather valves comprise a pressure valve 12 and a vacuum valve 13 both of which are in the form of flap valves. Valve 13 comprises a flap 14 which is hinged at 15 to the casing 10 and which forms a seal with the periphery of an aperture 16 provided by the casing when the ambient atmospheric pressure exceeds the pressure in the tank by, say, 2.5 kg./m² (0.5 p.s.i.) the flap 14 is lifted automatically as shown in chain lines by the pressure difference to allow air to flow through an aperture 18 in the casing and through the valve aperture 16 into the tank as indicated by the arrow 4 to relieve the partial vacuum within the tank. The pressure valve 12 is of similar construction to the valve 13 but is opened by excess pressure in the tank to allow gases from the tank to flow through the valve and the aperture 18 to atmosphere as indicated by the arrow 3. The excess pressure may for example be a selected pressure in the range 2.5 to 12 kg/m² (0.5 to 2.5 p.s.i.).

The constant velocity below-off valve is shown at 20 and comprises a pair of inclined hinged shutters 21 mounted above a valve aperture 22 in the casing and forming a seal with each other and the casing above the aperture 22. The shutters have weights 23 secured to them and loading them into a closed position as shown in full lines. When the pressure in the tank rises to a value sufficient to overcome the effect of the weights, the shutters swing apart to provide a slit through which gas can blow vertically upwards during loading of the tank with either cargo or ballast, as shown by the arrow 2.

The vacuum relief valve which is provided according to the invention is shown at 25 and comprises a light flap valve member 26 disposed vertically and arranged to swivel about a horizontal pin at its upper edge between a closed position and an open position, shown in full and chain lines respectively. The valve 25 is normally closed but a small negative pressure, for example about −2.5 cm (−1 inch) water gauge, is sufficient to cause the valve to open to relieve vacuum conditions in the tank as indicated by the arrow 1. In order to avoid unwanted opening of the valve when the ship rolls during loading or unloading, because of the low valve loading, the horizontal pin of the valve member is disposed at right angles to the length of the ship since ships do not pitch to any appreciable extent during loading and unloading. To render the valve 25 ineffective during a voyage, the valve aperture opens to a chamber 29 within the casing which chamber has a removable gas-tight cover 30 shown in its open position in the drawing. In the illustrated construction, the blow-off valve 20 also opens to the chamber 29.

The gas-tight cover 30 is removed before loading or unloading operations. During loading of the tank, air or gas displaced by the incoming cargo opens the blow-off valve when the pressure of the air or gas rises to a predetermined value. If for any reason, such as incorrect or negligent handling of the cargo loading and unloading valves, a partial vacuum is produced within the tank, the vacuum relief valve 25 will open automatically to allow air to flow into the tank rapidly but at a velocity of less than 61 m/sec (200 ft/sec) to relieve the vacuum.

While it is permissible to design the vacuum valve to allow air speeds as high as 61 m/sec. (200 ft/sec.) through the valve it is greatly preferred to restrict the air speed to a maximum of about 36.6 m/sec. (120 ft/sec.). In one example it was calculated that during the loading operation the maximum outflow of oil (assuming that it had a viscosity no lower than that of water) as a result of mishandling of the loading valves was about 3.66 m/sec. (12 ft/sec.) through a 91.5 cm. (36 inch) pipe. The vacuum relief valve installed in conjunction with a standard pressure vacuum valve therefore was provided with an effective aperture of 452 sq.cm. (70 sq. ins. (or approximately one-half sq.ft.) for the vauum refief valve together with a further 181 sq. cm. (28 sq. ins.) for the standard pressure vacuum valve giving a total of 633 sq. cm. (100 sq.ins.). This is approximately one-tenth of the area of the cargo pipe and the resultant velocity through the valves would be approximately 36 m./sec.

The effective areas of the breather valves 12 and 13 are of course very small in relation to that of the vacuum relief valve.

Although it is convenient to arrange the vacuum relief valve, the constant-velocity blow-off valve and the breather valves in a common casing as in the illustrated embodiment, it will be understood that the vacuum relief valve does not require the presence of the other valves for its operation.

We claim:

1. A ship valve system for use in ships having a closed tank for cargo and a conduit having one end in communication with said tank, comprising:
a casing structure providing two chambers which open to the atmosphere in communication with the other end of said conduit; a pair of non-return breather valves positioned within one chamber of said casing structure for controlling communication between said one chamber and said conduit, one of said breather valves opening to admit air into said closed tank through said one chamber when the pressure with said closed tank falls a predetermined amount below atmospheric pressure, the other of said breather valves opening when the pressure within said closed tank rises a predetermined amount above atmospheric pressure; and a non-return vacuum relief valve positioned within the other of said chambers for controlling communication between said conduit and said other chamber, said vacuum relief valve opening automatically when the pressure within the tank falls a predetermined amount below the ambient pressure in said other chamber and having an effective valve aperture sufficient to provide a total area for the ingress of air into the cargo tank at a velocity below 200 ft/sec. to maintain the pressure within the tank substantially at atmospheric pressure when the tank is being emptied at maximum rate; and means positioned on said other chamber for shutting off communication between said other chamber and the atmosphere, to thereby render said vacuum relief valve inoperative, without also cutting off communication between said one chamber and the ambient atmosphere.

2. A ship valve system as claimed in claim 1, wherein said means for shutting off communication between said other chamber and the atmosphere comprises a movable lid which seals said other chamber from the atmosphere.

3. A ship relief valve system as claimed in claim 1 wherein the vacuum relief valve permits the ingress of air into the cargo tank at a velocity not exceeding 120 ft/sec. when the tank is being emptied at the maximum rate.

4. A ship relief valve system as claimed in claim 1, wherein the vacuum relief valve comprises a flap valve.

5. A ship relief valve system as claimed in claim 4, wherein the flap valve is hingedly suspended from a horizontal pin which extends at right angles to the length of the ship.

6. A ship valve system for use in ships having a closed tank for cargo and a conduit having one end in communication with said tank, comprising:
a casing structure providing two chambers which open to the atmosphere in communication with the other end of said conduit; a pair of non-return breather valves positioned within one chamber of said casing structure for controlling communication between said one chamber and said conduit, one of said breather valves opening to admit air into said closed tank through said one chamber when the pressure with said closed tank falls a predetermined amount below atmospheric pressure, the other of said breather valves opening when the pressure within said closed tank rises a predetermined amount above atmospheric pressure; and a non-return vacuum relief valve positioned within the other of said chambers for controlling communication between said conduit and said other chamber, said vacuum relief valve opening automatically when the pressure within the tank falls a predetermined amount below the ambient pressure in said other chamber and having an effective valve aperture sufficient to provide a total area for the ingress of air into the cargo tank at a velocity below 200 ft/sec. to maintain the pressure within the tank substantially at atmsopheric pressure when the tank is being emptied at maximum rate; means positioned on said other chamber for shutting off communication between said other chamber and the atmosphere, to thereby render said vacuum relief valve inoperative, without also cutting off communication between said one chamber and the ambient atmosphere, said means being comprised of a movable lid; a non-return constant velocity pressure relief valve mounted in the casing structure to place said other chamber in communication with the conduit for relieving the pressure in the tank when said pressure exceeds the pressure in said other chamber by a predetermined amount.

* * * * *